(12) United States Patent
Liu

(10) Patent No.: US 7,706,389 B2
(45) Date of Patent: Apr. 27, 2010

(54) METHOD FOR IMPLEMENTING THE INTERACTION OF THE IWF SERVICE DATA

(75) Inventor: Qingshun Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 350 days.

(21) Appl. No.: 11/838,570

(22) Filed: Aug. 14, 2007

(65) Prior Publication Data
US 2008/0112407 A1    May 15, 2008

Related U.S. Application Data

(63) Continuation of application No. PCT/CN2006/000073, filed on Jan. 18, 2006.

(30) Foreign Application Priority Data
Mar. 18, 2005   (CN)  .................. 2005 1 0055378

(51) Int. Cl.
*H04W 92/02*   (2009.01)
(52) U.S. Cl. .................. 370/401; 370/466; 370/469
(58) Field of Classification Search .............. 370/328, 370/400, 401, 465, 466, 469
See application file for complete search history.

(56) References Cited

U.S. PATENT DOCUMENTS 6,385,195 B2 * 5/2002 Sicher et al. ............ 370/356
6,728,261 B1 * 4/2004 Sasson et al. ............ 370/466
6,898,213 B1 * 5/2005 Shimelmitz et al. ...... 370/537
6,928,294 B2 * 8/2005 Maggenti et al. ........ 455/518
7,096,261 B2 * 8/2006 Abrol et al. .............. 709/223
2002/0082006 A1 * 6/2002 Narvanen et al. ........ 455/426

FOREIGN PATENT DOCUMENTS

| KR | 2003018324 A | 3/2003 |
| WO | 9503667 A1 | 2/1995 |
| WO | 9405114 A1 | 3/2004 |

* cited by examiner

*Primary Examiner*—Pankaj Kumar
*Assistant Examiner*—Duc T Duong
(74) *Attorney, Agent, or Firm*—Finnegan, Henderson, Farabow, Garrett & Dunner LLP

(57) ABSTRACT

A method for implementing the interaction of the IWF service data includes the steps of that: the base station controller encapsulates the PPP data bearing the IWF server data into the RTP packet data by defining the IWF data carry format between the base station and the media gateway; the interaction of the IWF service data between the base station and the IWF device is implemented based on encapsulated packet. The method of this invention solves the problem of that: after the A interface between the base station and the mobile switch center is standardized by IP, it can't support the IWF service, because of not defining the IWF data bearer format between the base station controller and media gateway logical interface in the prior art, this invention can support the IWF service, after A interface is standardized by IP.

15 Claims, 6 Drawing Sheets

METHOD FOR IMPLEMENTING THE INTERACTION OF THE IWF SERVICE DATA

The present application is a continuation of PCT application PCT/CN2006/000073, filed on Jan. 18, 2006, entitled "A METHOD FOR IMPLEMENTING THE INTERACTION OF THE IWF SERVICE DATA", which is incorporated by reference herein in its entirety.

FIELD OF THE INVENTION

The present invention relates to the communication field, and in particular to a method for implementing the interaction of IWF (Inter Working Function) service data.

BACKGROUND OF THE INVENTION

An IWF device is a data intercommunication device in a wireless network, through which the wireless network is capable of implementing interaction of IWF service data with a different network, such as a PTSN (Public Switched Telephone Network), etc. The IWF services include asynchronous data service, PC facsimile service and analog facsimile service. As illustrated in FIG. 1, the asynchronous service refers to transmission and receipt of texts and files on a PC1 and a PC2 with the use of "Hyper Terminal" or alike, the PC facsimile service refers to implementation of a facsimile service on a PC using a facsimile software such as WinFax or the like, the analog facsimile service refers to implementation of a facsimile service through a connection of a facsimile machine with a fixed station (a terminal in the wireless network). The "Hyper Terminal" refers to a program, which can be invoked for a connection with another computer, an Internet remote login site, a BBS (Bulletin Board System), an online service and a host if a Modem or a Null Modem Cable is used.

The 3GPP2 has defined a standard supporting the asynchronous data service and the facsimile service in a CDMA (Code Division Multiple Access) system. In the protocol stack as illustrated in FIG. 2, asynchronous data and applications of facsimile in the application layer are borne through the TCP (Transmission Control Protocol)/IP (Internet Protocol)/PPP (Point to Point Protocol), wherein these protocols can be terminated at a fixed station MT2 and an IWF device. The fixed station MT is a terminal incapable of data processing, and hence has to be connected with a terminal device to enable the data processing. For instance, the fixed station can be connected with a facsimile machine to enable the facsimile service, and with the PC software "Hyper Terminal" to enable the asynchronous data service.

The IWF device can be located at a BSC (base station controller) or an MSC (Mobile Switching Center).

In the case that the IWF device is located at the BSC, the IWF device can accomplish a switching between the asynchronous data/facsimile applications borne through the TCP/IP/PPP and PSTN data/modulated facsimile data. The PSTN data/modulated facsimile data can be borne via a service interface between the BSC and the MSC, such as an A2 interface. A protocol stack for the A2 interface is illustrated in Table 1 with a bearer rate of 56/64 Kbps.

TABLE 1

56/64 Kbps PCM
DS0

In the case that the IWF device is located at the MSC, a logic interface between the BSC and the MSC, such as an A5 interface, can be used for transmission of the byte stream of the asynchronous data and facsimile data, and the ISLP (Intersystem Link Protocol) can be borne via the physical interface A2 to achieve a rate adaptation from air-interface data to 56/64 Kbps. The protocol stack for the A5 is illustrated in Table 2.

TABLE 2

Data Octet Stream
ISLP
DS0

In the case that a TDM (Time Division Multiplexing) system is used for transmission, a dedicated link of 56/64 Kbps is assigned for each user at A interfaces including an A1/A2/A5 interface, wherein the A1 interface is used for transmission of signaling, the A2 interface for transmission of voice data, and the A5 for transmission of the IWF service data. A bandwidth will still be occupied even if there is no data for transmission, thus resulting in a low utilization rate of bandwidths.

For improving the utilization rate of transmission resources of the A interfaces, the 3GPP2 has established a new standard IPizing the A1 interface/the A2 interface borne in the TDM system. That is, an IPized interface can be used for transmission of signaling and user data. User data can be borne through the IP/UDP (User Datagram Protocol)/RTP (Real-time Transport Protocol). Furthermore, a transcoder TC can be located in a core network, and thus instead of a 56/64 Kbps PCM code signal stream, an encoded/decoded data stream output from the transcoder TC can be borne on the RTP.

As obvious from the above, in the case of data transmission through the TDM, the bandwidth occupied for a user is a slot of 64K prior to IPizing the A interfaces. After the IPization of the A interfaces, the A interfaces can be enabled in a packet-switching way, and air-interface encoded/decoded data output from the transcoder TC can be transmitted, which is free from conversion into a 64 k PCM signal by the BSC. The air-interface encoded/decoded data has an average bandwidth of less than 8K, thus can save the transmission resources and greatly decrease the demands for transmission bandwidth of the A interfaces in comparison with the 64K bandwidth of the A interfaces prior to the IPization.

Although the IPization of the A1/A2 interface can decrease the demands for the transmission bandwidth of the A interfaces, the 3GPP2 has no definition of a bearer format (including protocol stack for the A5 interface, an RTP payload format, etc.) for the IWF data. The corresponding relationship between the defined standard service type and the RTP payload type is illustrated in Table 3, including Bearer Format IDs, Encoding Names, RTP Payload Types and Descriptions. Here the standard service type does not support bearing of an IWF service.

TABLE 3

| Bearer Format ID | Encoding Name[6] | RTP Payload Type Value[7] | Meaning |
|---|---|---|---|
| 0 | PCMU | Static | Mu-law (G.711) per [43] |
| 1 | PCMA | Static | A-law (G.711) per [43] |

TABLE 3-continued

| Bearer Format ID | Encoding Name[6] | RTP Payload Type Value[7] | Meaning |
| --- | --- | --- | --- |
| 2 | QCELP | Static | Header-full QCELP [IS-733] per [44] |
| 3 | EVRC | Dynamic | Header-full EVRC per [45] |
| 4 | EVRC0 | Dynamic | Header-free EVRC per [45] |
| 5 | SMV | Dynamic | Header-full SMV per [45] |
| 6 | SMV0 | Dynamic | Header-free SMV per [45] |
| 7 | telephone-event | Dynamic | DTMF digit & tone events per [46] |
| All other values reserved | | | |

In the case of data transmission with the TDM, the IWF data can be adapted to 64K by means of the protocol of ISLP borne via the A5 interface, and then be borne in 64K slots of the TDM. Since the 3 GPP2 has no definition of the bearer format (including protocol stack for the A5 interface, RTP payload format, etc.) for the IWF data, the IWF service data can not be transmitted to an IWF device, and consequently the IPized A interface is incapable of supporting the IWF service.

Obviously from the above, no bearer format for IWF data has been defined for the A5 interface by the 3GPP2 in the related art, and consequently an IPized A interface is incapable of supporting the IWF service.

SUMMARY OF THE INVENTION

The invention provides a method for implementing the interaction of IWF service data including:

RTP encapsulating, by a base station controller, PPP data that bear the InterWorking Function service data; and implementing the interaction of the IWF service data between a mobile station and an IWF device based upon RTP data packets encapsulated.

Optionally, the step of RTP encapsulating PPP data includes:

receiving and de-encapsulating, by the base station controller, RLP data packets transmitted from the mobile station to obtain the PPP data bearing the IWF service data; and encapsulating the PPP data into RTP data packets.

Optionally, the step of implementing the interaction of the IWF service data includes:

transmitting the RTP data packets from the base station controller to a media gateway;

de-encapsulating the RTP data packets at the media gateway to obtain the PPP data bearing the IWF service data; and transmitting the PPP data to the IWF device.

Optionally prior to the step of RTP encapsulating PPP data, the method further includes:

setting up an air-interface traffic channel for the IWF service between the base station controller and the mobile station; and encapsulating at the mobile station the IWF service data into PPP data packets for transmission through the air-interface traffic channel to the base station controller.

Optionally, the step of setting up an air-interface traffic channel for the IWF service between the base station controller and the mobile station includes:

transmitting from the mobile station to the base station controller an origination message with a service option indicative of the IWF service;

receiving at the base station controller the origination message, and transmitting an IWF service request message to a packetized mobile switching center based upon the IWF service indicated in the message;

transmitting based upon the message from the packetized mobile switching center to the base station controller a request for setting up an air-interface traffic channel; and setting up the air-interface traffic channel from the base station controller to the mobile station in response to the request.

Optionally, the step of setting up an air-interface traffic channel for the IWF service between the base station controller and the mobile station further includes:

transmitting from the base station controller to the packetized mobile switching center a message indicative of completing the setting up of the air-interface traffic channel.

Optionally, the step of encapsulating the PPP data into RTP data packets includes:

establishing a RTP payload type value via a call; and encapsulating the IWF service data into the RTP data packets based upon the RTP payload type value.

Optionally, the step of encapsulating the IWF service data into the RTP data packets based upon the RTP payload type value includes:

establishing the RTP payload type value used for a service type by means of bearer format-related parameters of a service interface between the base station controller and the mobile switching center, the parameters being in a message passing through a signaling interface between the base station controller and the mobile switching center.

Optionally, the bearer format-related parameters include a transmission format ID and an RTP payload type.

It can be seen from the above that the method of the invention defined the bearer format for IWF data via the A5 interface such that the base station controller can perform IP/UDP/RTP encapsulation of the PPP data packets bearing an IWF service, and then an interaction of the IWF service data can be enabled between the mobile station and the IWF device based upon the encapsulated data packets. Thus, the invention can overcome the problem that an IPized A interface is incapable of supporting an IWF service due to that the 3GPP2 has no definition of the bearer format for IWF data via the A5 interface in the related art. With the invention, the IWF service can be supported after IPization of an A interface.

DETAILED DESCRIPTION OF THE EMBODIMENTS

The invention provides a method for implementing interaction of IWF service data, which is implemented based upon the new standard established by the 3GPP2 that supports an IPized A interface (an IPized A1/A2 interface is called as A1p/A2p interface).

The protocol stack for the A1p interface is illustrated in Table 4, where at the IOS Application layer, signaling of the IPized A1 interface can be borne through a protocol of Signaling Connection Control Part User Adaptation Layer (SUA).

TABLE 4

IOS Application
SUA
SCTP
IP
Link Layer
Physical Layer

The protocol stack for the A2p interface is illustrated in Table 5. As can be seen from Table 5, the A2p interface bears various types of service data through the IP/UDP/RTP.

TABLE 5

User Traffic
RTP
UDP
IP
Link Layer
Physical Layer

To distinguish various types of service data, a unique RTP payload type identifier (ID) is assigned to each service type, and each service type has a unique payload format.

The RTP payload type ID can be of a static type or a dynamic type. The static payload type ID takes a fixed payload type value, while the dynamic payload type ID is dynamically assigned with a value ranging from 96 to 127 upon setting up a call.

Figure 3:
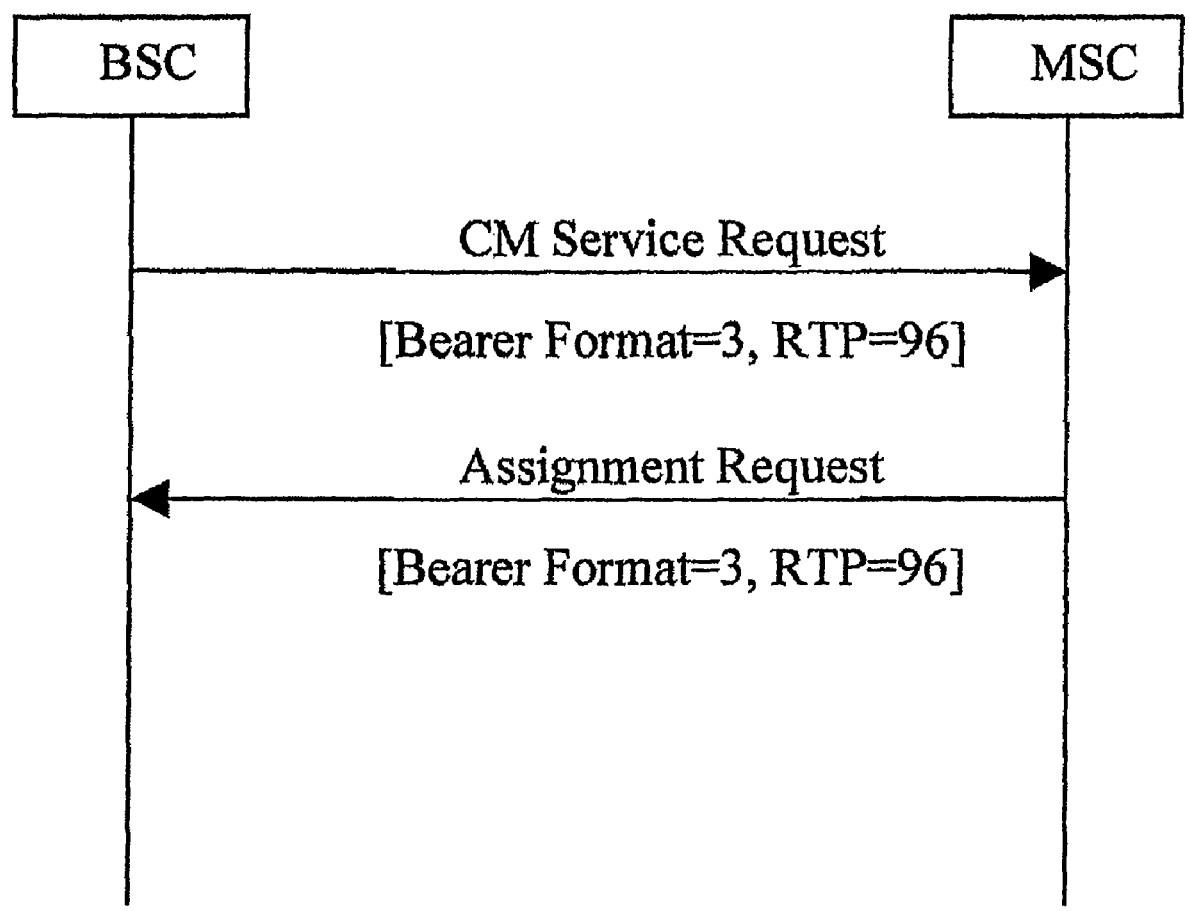
FIG. 3 is a flow chart for dynamic assignment of a value to a dynamic payload in case that a user A initiates a speech call service in the related art.
Figure 4:
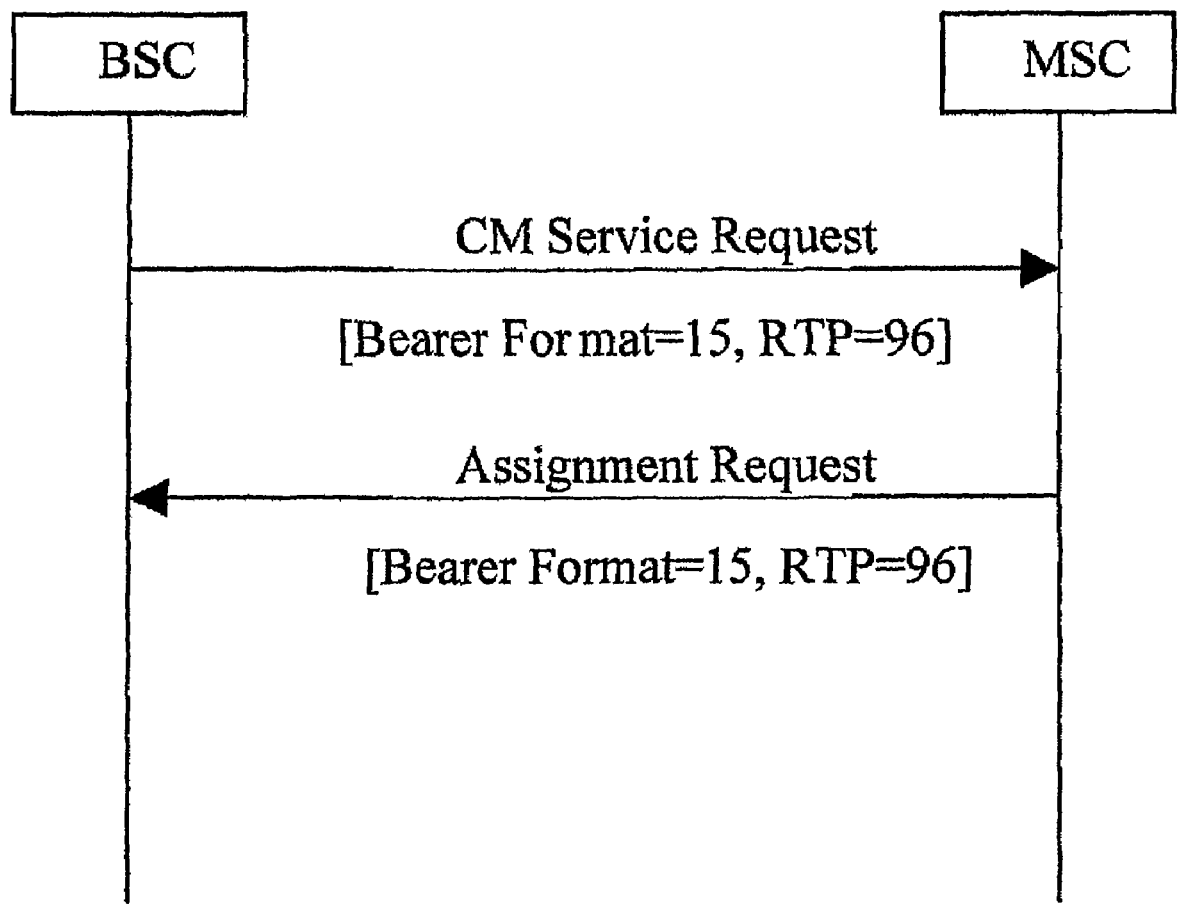
FIG. 4 is a flow chart for dynamic assignment of a value to a dynamic payload in case that a user B initiates an IWF service in the related art.
Figure 5:
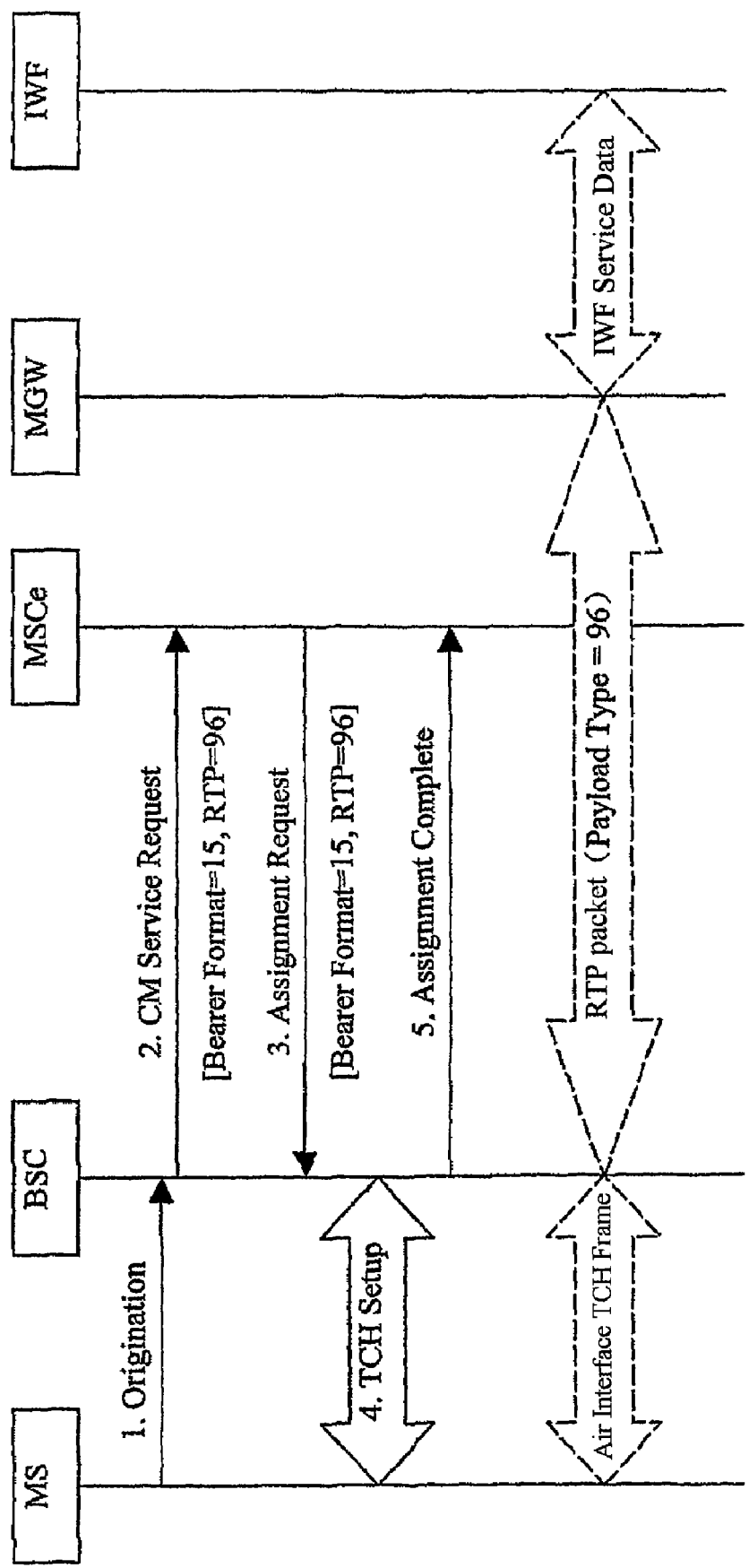
FIG. 5 is a flow chart for establishment of an air-interface service channel between a mobile station and an MSC according to the invention.

For instance, during a dynamic assignment, a user A initiates a speech call service (Bearer Format=3, EVRC) with RTP TYPE=96 through negotiation, as illustrated in FIG. 3, and a user B initiates an IWF service (Bearer Format=15) also with RTP TYPE=96 through negotiation, as illustrated in FIG. 4. RTP TYPE=96 can indicate an EVRC speech call or an IWF call.

In the case of a static assignment, for example RTP TYPE=96 indicates an EVRC speech call, and RTP TYPE=97 indicates an IWF call, which is static.

In the case of a static assignment, the space of RTP payload types may be insufficient in the case of numerous service types, while the problem of insufficient space of RTP payload types does not occur in the case of a dynamic assignment since one user uses a limited number of types of services at the same time.

Upon setting up a call, Bearer Format ID and RTP Payload Type among A2p bearer format-related parameters in an A1p message can be used to designate the value of an RTP payload type used for a service type. The A2p bearer format-related parameters are illustrated in Table 6:

TABLE 6

| 7 | 6 | 5 | 4 | 3 | 2 | 1 | 0 | Octet |
|---|---|---|---|---|---|---|---|---|
| | | | A1p Element Identifier | | | | | 1 |
| | | | Length | | | | | 2 |
| | | Reserved | | | Bearer Format ID | | | 3 |
| | | | RTP Payload Type | | | | | 4 |
| Reserved | Ext | Bearer Format Tag Type | | Bearer IP Address Type | | | Bearer Addr Flag | 5 |
| (MSB) | | | Bearer IP Address | | | | | i |
| | | | ... | | | | | ... |
| | | | | | | 1 | (LSB) | j |
| (MSB) | | | Bearer UDP Port | | | | | j + 1 |
| | | | | | | | (LSB) | j + 2 |
| | Extension Length | | | | Extension ID | | | k |
| | | | Extension Parameters | | | | | k + 1 |
| | | | ... | | | | | ... |

In the invention, an RTP payload type for transmission of a transparent frame can be negotiated by means of Bearer Format ID as defined in Table 7, where the value of 15 thereof is merely an example.

TABLE 7

| Bearer Format ID | Encoding Name | RTP Payload Type | Meaning |
|---|---|---|---|
| 15 | Transparent Frame | Dynamic | Transparent frame can be used for transmission of PPP byte stream of IWF service, the payload size is determined by the length of the IP header, and neither rate/mode control nor time synchronization is required. |

The flow for negotiation about transmission of an RTP payload, i.e. IWF service data, will be described in detail hereinafter according to the invention.

In step 1, a user initiates an IWF service (e.g. a facsimile service), and a Mobile Station (MS) transmits an Origination message to a BSC with a Service Option indicative of a facsimile service.

In step 2, the BSC transmits to an MSC an IWF service request (CM Service Request) message with a Bearer Format ID of 15 indicative of an IWF service, the ID for the RTP payload type to be used is set as 96, and an IP address and a UDP port number on the BSC side are designated. The IP/RTP/UDP packet of a Media Gateway (MGW) via the A2p interface can be transmitted to the IP address and the UDP port number designated.

In step 3, the MSC transmits an Assignment Request message with the IP address and UDP port number of the MGW, requesting the BSC for setting up an air-interface Traffic Channel (TCH). The IP/RTP/UDP packet of the BSC via the A2p interface can be transmitted to the IP address and the UDP port number in the message.

In step 4, the air-interface TCH is set up between the BSC and the MS.

In step 5, the BSC transmits an Assignment Complete message to the MSC after completion of the TCH setting up.

Figure 6:
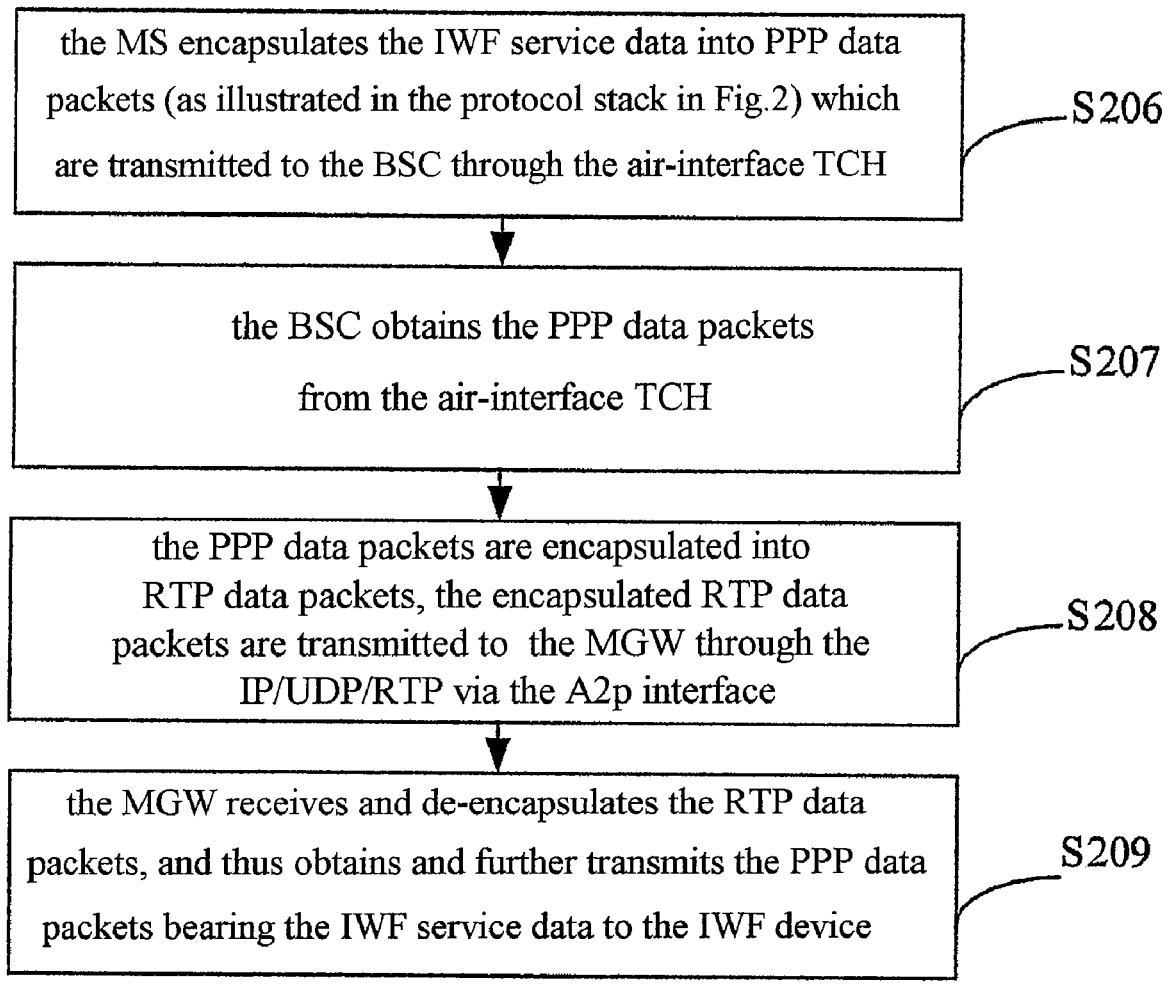
FIG. 6 is a flow chart for implementation of interaction of IWF service data between a mobile station and an IWF device according to the invention.

After the above steps, the setting up of an air-interface TCH between the MS and the BSC is finished. An exchange of IWF service data can be imitated between the MS and an IWF device, in particular including the following steps as illustrated in FIG. 6.

Figure 1:
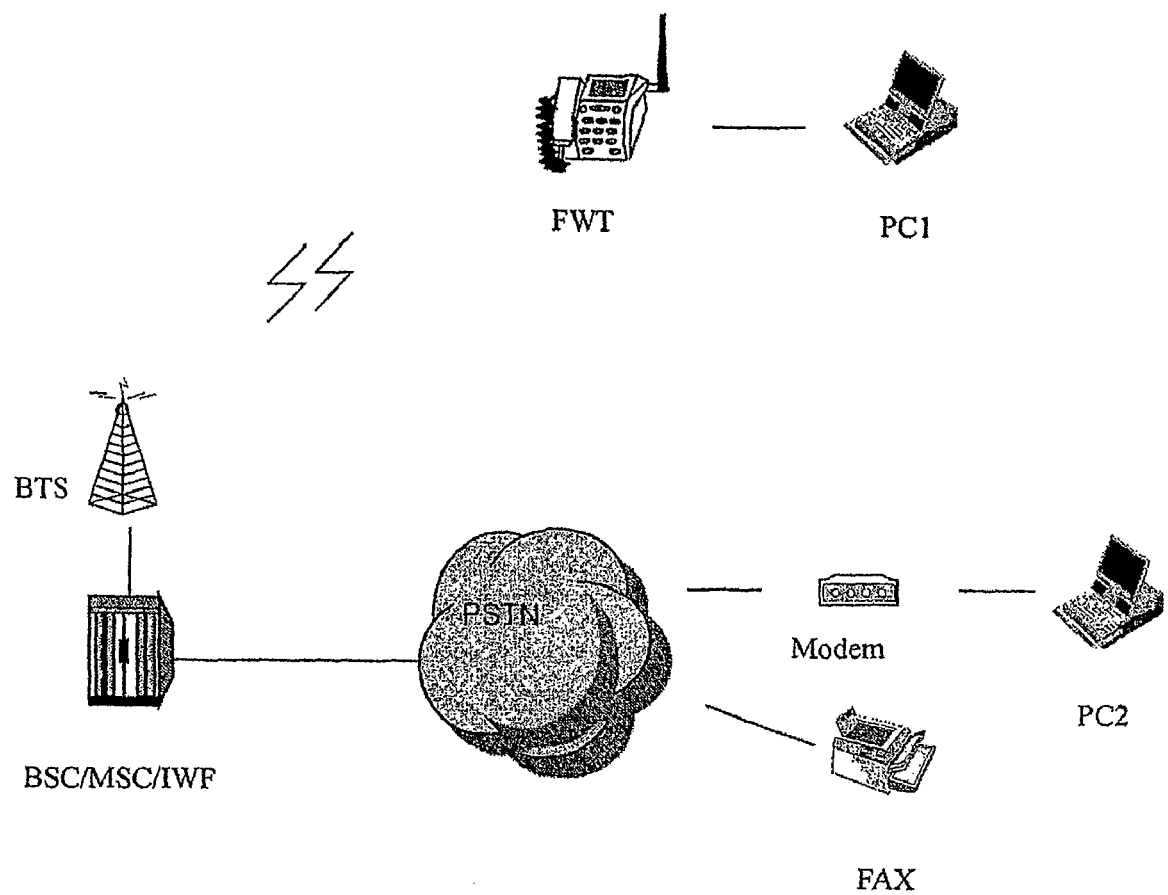
FIG. 1 is a schematic diagram of networking for the IWF service in the related art.
Figure 2:
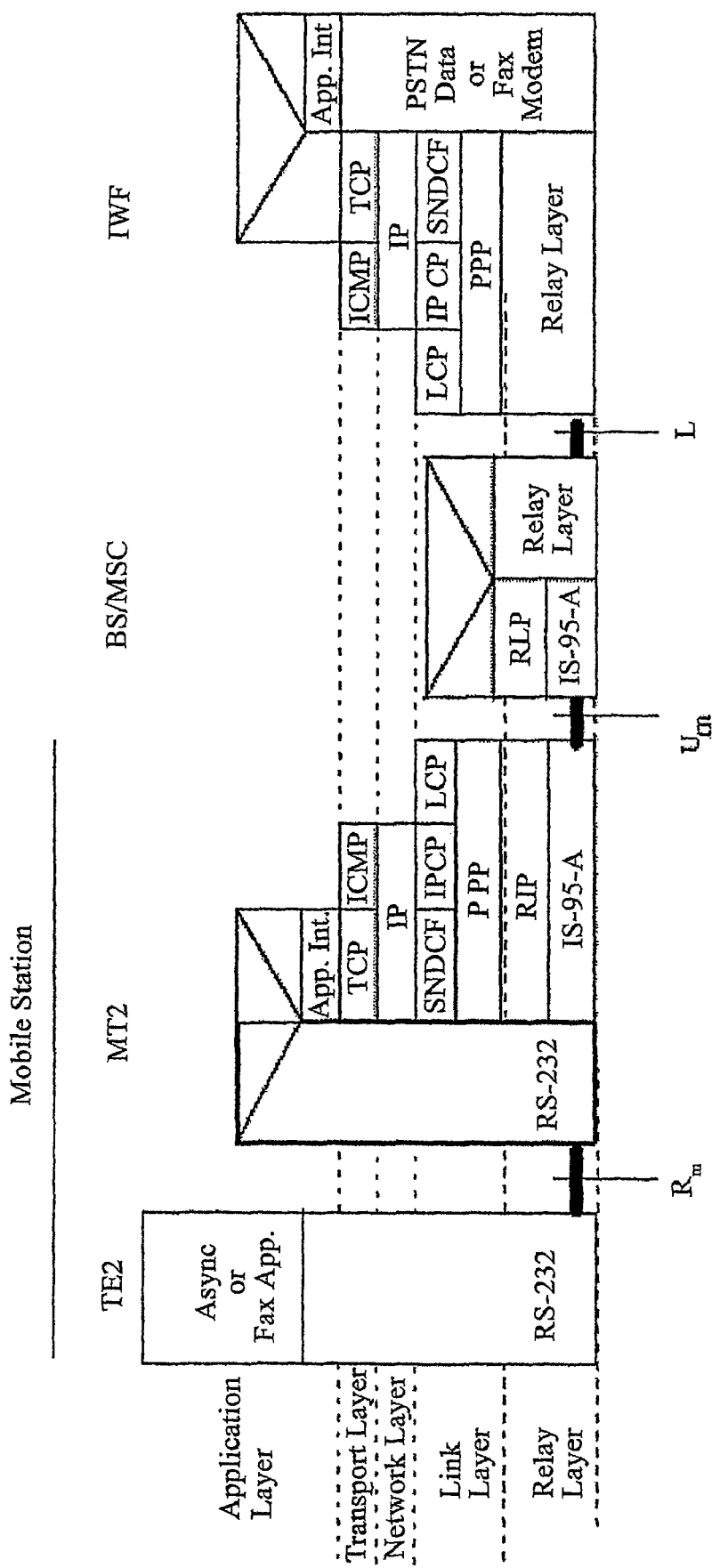
FIG. 2 is a structural diagram of the protocol stack for the IWF service in the related art.

In step S206, the MS encapsulates the IWF service data into PPP data packets (as illustrated in the protocol stack in FIG. 2) which are transmitted to the BSC through the air-interface TCH.

In step S207, the BSC obtains the PPP data packets from the air-interface TCH.

In step S208, the PPP data packets are encapsulated into RTP data packets, where RTP payload is the PPP data packet and the RTP payload type is the type negotiated during the call setting up. Since the RTP is borne through the IP/UDP, the encapsulated RTP data packets can be transmitted to the MGW through the IP/UDP/RTP via the A2p interface.

In step S209, the MGW receives and de-encapsulates the RTP data packets, and thus obtains and further transmits the PPP data packets bearing the IWF service data to the IWF device.

In the case of a TDM interface between the MGW and the IWF, MGW should be adapted to 64 Kbps through the ISLP protocol for transmission of the PPP data packets to the IWF device.

It can be seen from the above that the invention defines a new RTP transparent-frame bearer format which can be used to RTP-encapsulate at a base station controller (BSC) the obtained PPP data packets bearing the IWF service data transmitted from the mobile station, the payloads of the encapsulated RTP data packets can be directly used for transmission of asynchronous data, such as the PPP data of a PC facsimile and an analog facsimile between the MS and the IWF, thus an IPized A interface for an IWF service can be supported. The PPP has its own frame boundary identification, is not very sensitive to a time delay, and requires no mode control, rate control or time synchronization.

The present invention has been described and illustrated with reference to the embodiments thereof and the drawings. It shall be obvious to those skilled in the art that those embodiments and drawings are merely illustrative but not restrictive in any aspect, that the present invention shall not be limited the embodiments disclosed here, and that various modifications and variations can be made thereto in light of the descriptions and the drawings without departing from the spirit and scope of the present invention as defined in the accompanying claims.

What is claimed is:

1. A method for implementing interaction of InterWorking Function service data, comprising:
    encapsulating, by a base station controller, Point to Point Protocol data that bear the InterWorking Function service data into Real-time Transport Protocol data packets;
    transmitting the Real-time Transport Protocol data packets from the base station controller to a media gateway;
    de-encapsulating the Real-time Transport Protocol data packets at the media gateway to obtain the Point to Point Protocol data bearing the InterWorking Function service data; and
    transmitting the obtained Point to Point Protocol data to an InterWorking Function device.

2. The method according to claim 1, wherein encapsulating Point to Point Protocol data comprises:
    receiving and de-encapsulating, by the base station controller, Radio Link Protocol data packets transmitted from a mobile station to obtain the Point to Point Protocol data bearing the InterWorking Function service data; and
    encapsulating the obtained Point to Point Protocol data bearing the InterWorking Function service data by the base station controller into the Real-time Transport Protocol data packets.

3. The method according to claim 2, wherein prior to encapsulating Point to Point Protocol data, the method further comprises:
    setting up an air-interface traffic channel for the InterWorking Function service between the base station controller and the mobile station; and
    encapsulating at the mobile station the InterWorking Function service data into Point to Point Protocol data packets for transmission through the air-interface traffic channel to the base station controller.

4. The method according to claim 3, wherein the step of setting up an air-interface traffic channel for the InterWorking Function service between the base station controller and the mobile station comprises:
    transmitting from the mobile station to the station controller an origination message with a service option indicative of the InterWorking Function service;
    receiving at the base station controller the origination message, and transmitting an InterWorking Function service request message to a packetized mobile switching center based upon the InterWorking Function service indicated in the origination message;
    transmitting, based upon the InterWorking Function service request message from the packetized mobile switching center to the base station controller, a request for setting up an air-interface traffic channel; and
    setting up the air-interface traffic channel from the base station controller to the mobile station according to the request for setting up an air-interface traffic channel.

5. The method according to claim 4, wherein setting up an air-interface traffic channel for the InterWorking Function service between the base station controller and the mobile station further comprises:

transmitting from the base station controller to the packetized mobile switching center a message indicative of completing the setting up of the air-interface traffic channel.

6. The method according to claim 5, wherein encapsulating the obtained Point to Point Protocol data bearing the InterWorking Function service data into the Real-time Transport Protocol data packets comprises:
   establishing a Real-time Transport Protocol payload type value via a call; and
   encapsulating the Point to Point Protocol data bearing the InterWorking Function service data into the Real-time Transport Protocol data packets based upon the Real-time Transport Protocol payload type value.

7. The method according to claim 6, wherein establishing a Real-time Transport Protocol payload type value via a call comprises:
   establishing the Real-time Transport Protocol payload type value used for a service type by means of bearer format-related parameters of a service interface between the base station controller and the mobile switching center, the parameters being in a message passing through a signaling interface between the base station controller and the mobile switching center.

8. The method according to claim 7, wherein the bearer format-related parameters comprise a transmission format ID and a Real-time Transport Protocol payload type.

9. An apparatus for implementing interaction of InterWorking Function service data, comprising:
   a first module configured to encapsulate Point to Point Protocol data that bear InterWorking Function service data into Real-time Transport Protocol data packets;
   a second module configured to transmit the Real-time Transport Protocol data packets to a media gateway, which is configured to de-encapsulate the data packets to obtain the Point to Point Protocol data bearing the InterWorking Function service data and transmit the obtained Point to Point Protocol data to an InterWorking Function device.

10. The apparatus according to claim 9, wherein the first module comprises:
   a third module configured to receive and de-encapsulate Radio Link Protocol data packets transmitted from a mobile station to obtain the Point to Point Protocol data bearing the InterWorking Function service data; and
   a fourth module configured to encapsulate the obtained Point to Point Protocol data bearing the InterWorking Function service data into the Real-time Transport Protocol data packets.

11. The apparatus according to claim 10, further comprising:
   a fifth module configured to set up an air-interface traffic channel for the InterWorking Function service between the base station controller and the mobile station,
   wherein the obtained Point to Point Protocol data packets bearing the InterWorking Function service data by the base station controller are transmitted through the air-interface traffic channel.

12. The apparatus according to claim 11, wherein the fifth module comprises:
   a sixth module configured to receive an origination message from the mobile station with a service option indicative of the InterWorking Function service;
   a seventh module configured to transmit an InterWorking Function service request message to a packetized mobile switching center based upon the InterWorking Function service indicated in the origination message;
   an eighth module configured to receive a request for setting up an air-interface traffic channel from the packetized mobile switching center; and
   a ninth module configured to set up the air-interface traffic channel from the base station controller to the mobile station according to the request for setting up an air-interface traffic channel.

13. The apparatus according to claim 12, wherein the fourth module comprises:
   a tenth module configured to establish a Real-time Transport Protocol payload type value via a call; and
   an eleventh module configured to encapsulate the Point to Point Protocol data bearing the InterWorking Function service data into the Real-time Transport Protocol data packets based upon the Real-time Transport Protocol payload type value.

14. The apparatus according to claim 13, wherein the tenth module further comprises:
   a twelfth module configured to establish the Real-time Transport Protocol payload type value used for a service type by bearer format-related parameters of a service interface between the base station controller and the mobile switching center, the parameters being in a message passing through a signaling interface between the base station controller and the mobile switching center.

15. The apparatus according to claim 14, wherein the bearer format-related parameters comprise a transmission format ID and a Real-time Transport Protocol payload type.

* * * * *